United States Patent [19]

Sato et al.

[11] Patent Number: 5,614,125

[45] Date of Patent: Mar. 25, 1997

[54] POLYMERIC LIQUID-CRYSTAL COMPOUND, POLYMERIC LIQUID-CRYSTAL COMPOSITION, AND POLYMERIC LIQUID-CRYSTAL DEVICE

[75] Inventors: Koichi Sato, Atsugi; Kazuo Yoshinaga, Machida; Yomishi Toshida, Yokohama; Takeo Eguchi, Atsugi, all of Japan

[73] Assignee: Canon Kabushiki Kaisha, Tokyo, Japan

[21] Appl. No.: 820,806

[22] Filed: Jan. 15, 1992

Related U.S. Application Data

[63] Continuation of Ser. No. 562,695, Aug. 6, 1990, abandoned.

[30] Foreign Application Priority Data

Aug. 8, 1989 [JP] Japan ................................. 1-203934
Jul. 18, 1990 [JP] Japan ................................. 2-187938

[51] Int. Cl.⁶ .......................... C09K 19/52; C09K 19/30; G02F 1/13
[52] U.S. Cl. ................. 252/299.01; 252/299.6; 252/299.62; 252/199.63; 252/299.66; 252/299.67; 349/184
[58] Field of Search ............... 252/249.01, 299.6, 252/299.62, 299.63, 299.66, 299.67; 528/100, 191; 359/103, 104

[56] References Cited

U.S. PATENT DOCUMENTS

| | | | |
|---|---|---|---|
| 4,367,924 | 1/1983 | Clark et al. | 350/334 |
| 4,798,680 | 1/1989 | Nohira et al. | 252/299.01 |
| 4,807,968 | 2/1989 | Lesile | 350/311 |
| 4,818,807 | 4/1989 | Morita et al. | 528/191 |
| 4,844,835 | 7/1989 | Uchida et al. | 252/299.01 |
| 4,867,538 | 9/1989 | Yoon et al. | 350/350 R |
| 4,877,858 | 10/1989 | Hachiya et al. | 528/100 |
| 4,892,675 | 1/1990 | Nohira et al. | 252/299.01 |
| 4,917,821 | 4/1990 | Mori et al. | 252/299.63 |
| 4,973,373 | 11/1990 | Hashimoto et al. | 428/1 |
| 5,034,153 | 7/1991 | Uchida et al. | 252/299.65 |
| 5,252,251 | 12/1993 | Sato et al. | 252/299.01 |

FOREIGN PATENT DOCUMENTS

| | | |
|---|---|---|
| 0258898 | 3/1988 | European Pat. Off. . |
| 0274128 | 7/1988 | European Pat. Off. . |
| 0297554 | 1/1989 | European Pat. Off. . |
| 0348873 | 1/1990 | European Pat. Off. . |
| 0355772 | 2/1990 | European Pat. Off. . |
| 0376310 | 7/1990 | European Pat. Off. . |
| 107216 | 8/1981 | Japan . |
| 232886 | 10/1985 | Japan . |
| 72784 | 4/1988 | Japan . |
| 99204 | 4/1988 | Japan . |
| 161005 | 7/1988 | Japan . |
| 213318 | 8/1989 | Japan . |

*Primary Examiner*—Shean C. Wu
*Attorney, Agent, or Firm*—Fitzpatrick, Cella, Harper & Scinto

[57] ABSTRACT

The present invention provides a polymeric liquid-crystal compound having a repeating unit represented by Formula (I)

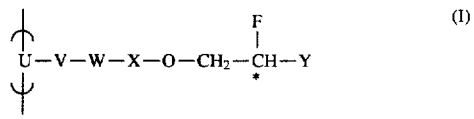

wherein U represents a polymer main chain; V represents $-(CH_2)_m-$, $-((CH_2)_2-O)_m-$ or $-(CH_2)_n-((CH_2)_2-O)_p-$, one or more of methylene hydrogen atoms of which may be substituted with an alkyl group, a halogen atom, a cyano group, an amino group or a carbonyl group, and m, n and p each represents an integer of 0 to 30; W represents a single bond, $-O-$, $-OCO-$, $-COO-$, $-CONR^1-$, $-CO-$ or $-NR^1$, where $R^1$ represents a hydrogen atom or an alkyl group; X represents two or more rings of a substituted or unsubstituted aliphatic ring or aromatic ring of benzene ring, heteroaromatic ring or condensed ring, which rings are bonded through a single bond, $-O-$, $-OCO-$, $-COO-$, $-(CH_2)_q-$, $-N=N-$, $-(CH=CH)_q-$, $-CH=N-$, $-(C\equiv C)_q-$, $-CONR^1-$, $-(CO)_q-$, or $-NR^1-$, where q represents an integer of 1 to 10; Y represents a substituted or unsubstituted alkyl group; and the mark * represents an asymmetric carbon atom.

12 Claims, 1 Drawing Sheet

POLYMERIC LIQUID-CRYSTAL COMPOUND, POLYMERIC LIQUID-CRYSTAL COMPOSITION, AND POLYMERIC LIQUID-CRYSTAL DEVICE

This application is a continuation of application Ser. No. 562,695, filed Aug. 6, 1990, now abandoned.

BACKGROUND OF THE INVENTION

1. Field of the Invention

The present invention relates to a novel polymeric liquid-crystal compound having an optically active group on its polymer side chain, a polymeric liquid-crystal composition comprising the polymeric liquid-crystal compound, and a polymeric liquid-crystal device using these.

The polymeric liquid-crystal compound of the present invention and the polymeric liquid-crystal composition containing the polymeric liquid-crystal compound can be used as materials for optoelectronics or materials for optical devices as typified by display devices and memories.

2. Related Background Art

Hitherto known liquid-crystal devices include a device that employs the twisted nematic liquid crystal as disclosed in M. Schadt and W. Helfrich, Voltage Dependent Optical Activity of a Twisted Nematic Liquid Crystal, "Applied Physics Letters", Vol. 18, No. 4, pp. 127–128 (Feb. 15, 1971). This twisted nematic liquid crystal, however, has a problem of crosstalk occurring at the time of a time division drive using a matrix electrode system having a high density of picture elements, and hence has a restriction in the number of the picture elements.

There has been also a limit in its use as a display device because of a slow electric field response and poor visual-field angle characteristics. This liquid crystal has another problem that a very complicated process is required for the formation of a thin-film transistor for each picture element and moreover a display device with a large area can be produced with difficulty.

For eliminating the disadvantages of such a conventional liquid-crystal device, Clark and Lagerwall have proposed to use a liquid-crystal device comprised of a bistable element (see Japanese Patent Appln. Laid-Open No. 56-107216 and U.S. Pat. No. 4,367,924).

Commonly used as this liquid crystal comprised of a bistable element is a ferroelectric liquid crystal comprised of a chiral smectic C phase (Sm*C) or H phase (Sm*H). This ferroelectric liquid crystal exhibits spontaneous polarization, and hence has a very quick response and moreover can produce a bistable state with memory performance. In addition, it has superior visual-field angle characteristics, and hence can be considered to be suited as a material for display with a large capacity and a large area. When, however, a liquid crystal cell is actually formed, it is difficult to achieve a monodomain over a large area, and a technical problem has remained unsettled in making a display device with a large screen.

It is also known to use a polymeric liquid-crystal as a memory medium.

This can be exemplified by the heat-writing memory as disclosed in V. Shibaev, S. Kostromin, N. Plate, S. Ivanov, V. Vestrov and I. Yakovlev, Thermotropic Liquid Crystalline Polymers 14, "Polymer Communications", Vol. 24, pp. 364–365.

This method, however, can attain only a poor contrast since scattering of light is utilized for reading, and also has the problem that the response speed is much lower than low molecular liquid crystal because of high viscosity of polymer. Accordingly, this method has not been put into practical use.

Japanese Patent Appln. Laid-Open No. 63-72784, No. 63-99204 and No. 63-161005 disclose ferroelectric polymeric liquid-crystals having as a chiral moiety a hydrocarbon alcohol such as amyl alcohol. These, however, all have the disadvantages such that they exhibit too small spontaneous polarization because of their structure to give a quick response.

SUMMARY OF THE INVENTION

An object of the present invention is to provide a novel, optically active polymeric liquid-crystal compound that enables large-area display and has good response characteristics as materials for optoelectronics and materials for optical devices, and also provide a polymeric liquid-crystal composition comprising such a polymeric liquid-crystal compound and a polymeric liquid-crystal device using these.

As a result of intensive studies made in view of the above prior art techniques, the present inventors have found that a novel polymeric liquid-crystal compound having an optically active group on its side chain and a polymeric liquid-crystal composition comprising the same has a good response, and a liquid-crystal device can readily achieve large-area display, making the most of the features of a polymer. They have thus accomplished the present invention.

Stated summarily, a first invention of the present invention is a polymeric liquid-crystal compound characterized by having a repeating unit represented by the following Formula (I).

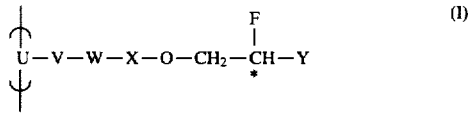

wherein U represents a polymer main chain; V represents $-(CH_2)_m-$, $-((CH_2)_2-O)_m-$ or $-(CH_2)_n-((CH_2)_2-O)_p-$, one or more of methylene hydrogen atoms of which may be substituted with an alkyl group, a halogen atom, a cyano group, an amino group or a carbonyl group, and m, n and p each represents an integer of 0 to 30; W represents a single bond, $-O-$, $-OCO-$, $-COO-$, $-CONR^1-$, $-CO-$ or $-NR^1$, where $R^1$ represents a hydrogen atom or an alkyl group; X represents two or more rings of a substituted or unsubstituted aliphatic ring or aromatic ring of benzene ring, heteroaromatic ring or condensed ring, which rings are bonded through a single bond, $-O-$, $-OCO-$, $-OCO-$, $-COO-$, $-(CH_2)_q-$, $-N=N-$, $-(CH=CH)_q-$, $-CH=N-$, $-(C\equiv C)_q-$, $-CONR^1-$, $-(CO)_q-$ or $-NR^1-$, where q represents an integer of 1 to 10; Y represents a substituted or unsubstituted alkyl group; and the mark * represents an asymmetric carbon atom.

A second invention of the present invention is a polymeric liquid-crystal composition characterized by containing as a blend component at least one of the polymeric liquid-crystal compound having a repeating unit represented by the above Formula (I).

A third invention of the present invention is a polymeric liquid-crystal device characterized by comprising the polymeric liquid-crystal composition containing as a blend component at least one of the polymeric liquid-crystal compound having a repeating unit represented by the above Formula (I).

BRIEF DESCRIPTION OF THE DRAWINGS

FIG. 1B is a cross section along the line A—A' in FIG. 1A.

DETAILED DESCRIPTION OF THE PREFERRED EMBODIMENTS

Figure 1A:
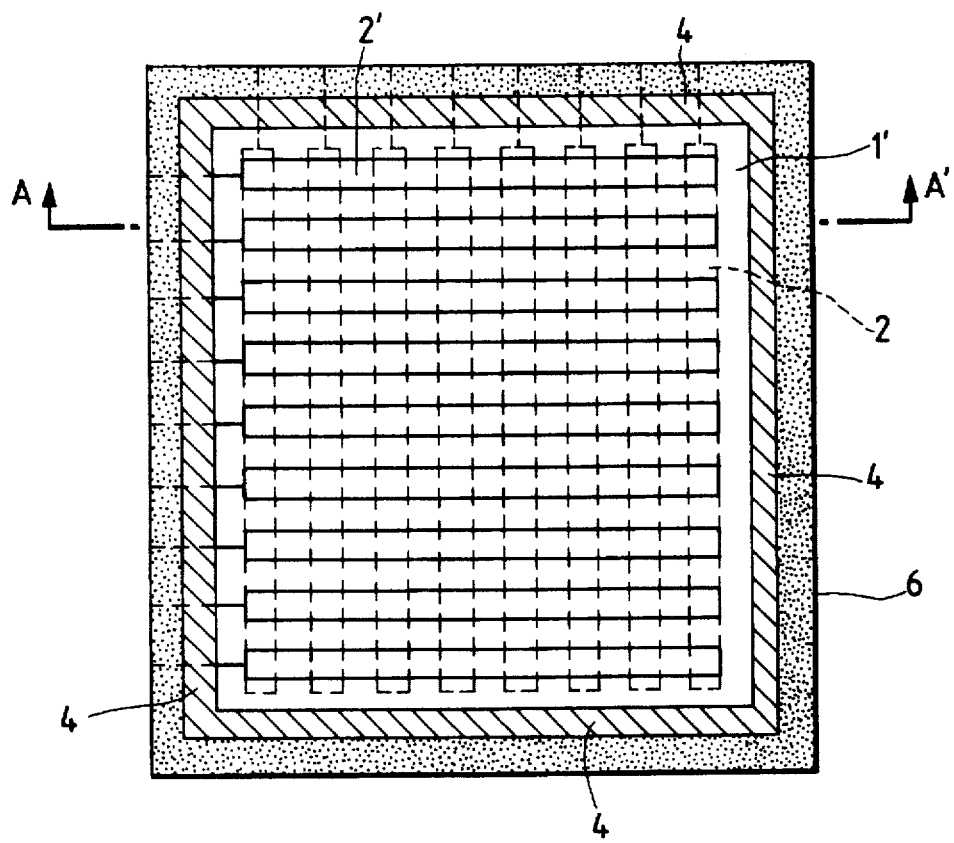
FIGS. 1A and 1B schematically illustrate a polymeric liquid-crystal device of the present invention.

The polymeric liquid-crystal compound of the present invention is a compound having a repeating unit represented by the following Formula (I).

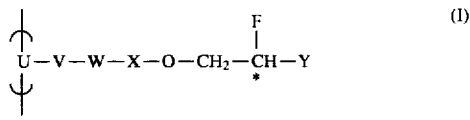

In the above Formula (I), V is a spacer, U is a polymer main chain containing the part through which the spacer V is linked, X is a mesogen, W is a group to link the spacer V with the mesogen X, and

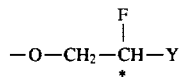

is the chiral moiety.

U represents a polymer main chain chemically bonded to the spacer V, which is a polymer main chain of a radical polymerization type, a polymer main chain of a condensation polymerization type, or a polymer main chain to be formed after the reaction of grafting a side chain structure to a polymer main chain capable of introducing a side chain structure as a result of graft polymerization. The polymer main chain represented by U includes, for example, a polyvinyl polymer such as polyacryl, polymethacryl or polystyryl, a condensation polymer such as polyester or polyamide, or polyoxyalkylene, polyphosphazen, and polysiloxane. It more specifically includes those having the following structure:

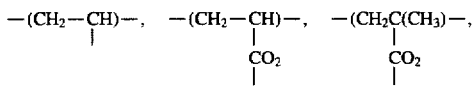

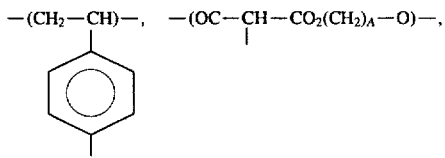

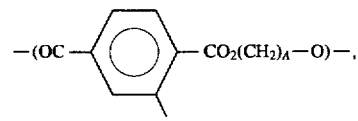

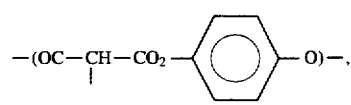

where A represents an integer of 1 to 30,

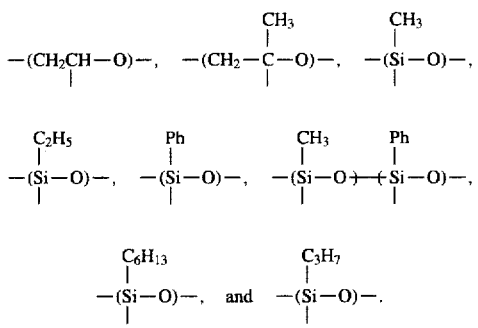

Of these, preferred is a siloxane main chain in view of a low viscosity and a good response.

The spacer V represents $—(CH_2)_m—$, $—((CH_2)_2—O)_m—$ or $—(CH_2)_n—((CH_2)_2—O)_p—$ (m, n and p each represents an integer of 0 to 30), one or more of methylene hydrogen atoms of which may be substituted with an alkyl group, a halogen atom, a cyano group, an amino group or a carbonyl group.

Of these, preferred is $—((CH_2)_2—O)_m—$ in view of a liquid crystal temperature which is near to room temperature, and a good response for low viscosity.

Particularly preferably, m is 4 to 12.

W is a single bond, including —O—, —OCO—, —COO—, —CONR$^1$—, —CO— or —NR$^1$, where R$^1$ represents a hydrogen atom or an alkyl group.

X represents two or more rings of a substituted or unsubstituted aliphatic ring or aromatic ring of benzene ring, heteroaromatic ring or condensed ring, which rings are bonded through a single bond, —O—, —OCO—, —COO—, $—(CH_2)_q—$, —N=N—, $—(CH=CH)_q—$, —CH=N—, $—(C≡C)_q—$, —CONR$^1$—, $—(CO)_q—$ or —NR$^1$—, where q represents an integer of 1 to 10.

X specifically includes the following:

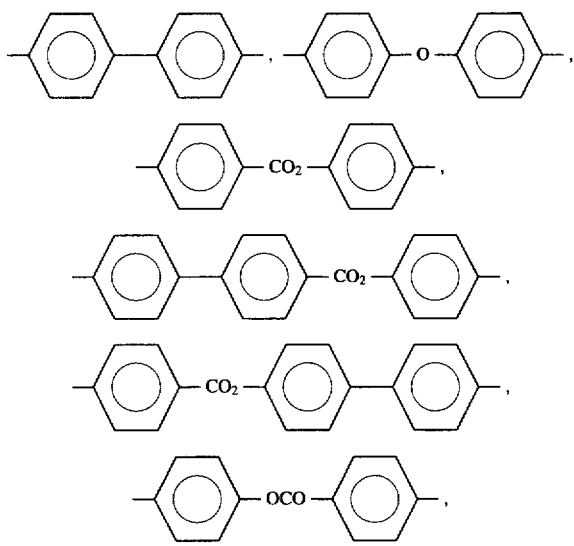

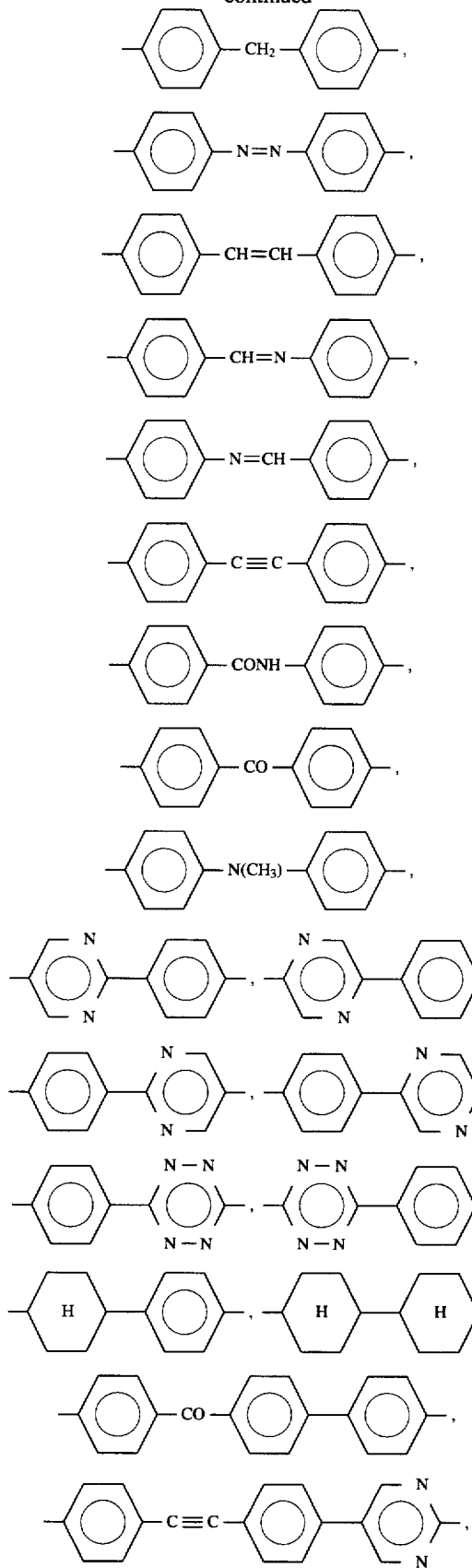
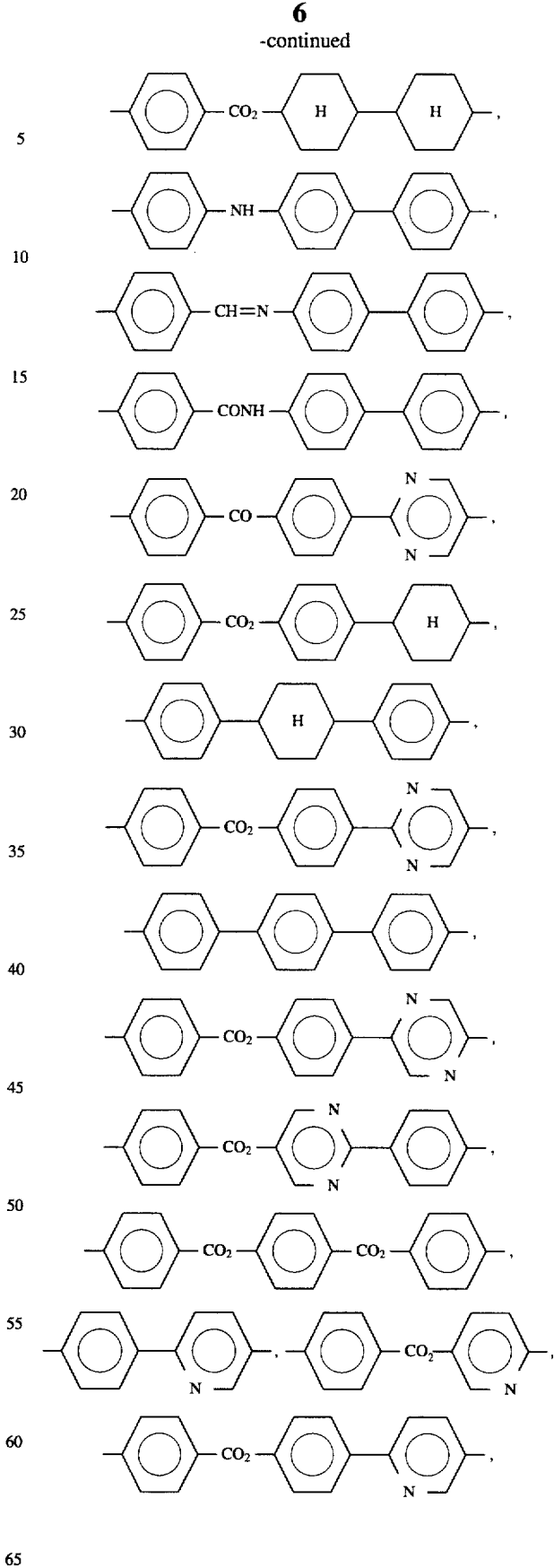

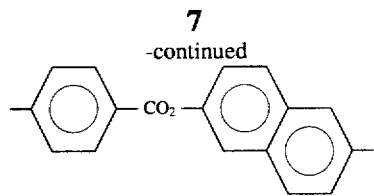
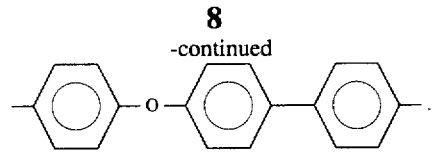
Y represents an alkyl group of various kinds.
The polymeric liquid-crystal compound of the present invention specifically includes the compounds having the following structure.
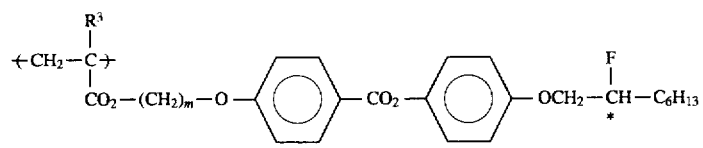 (1-A)
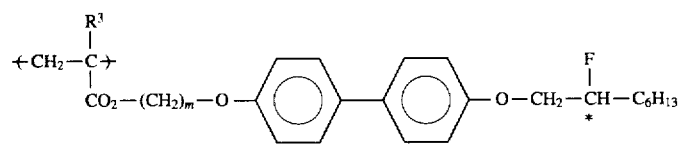 (1-B)
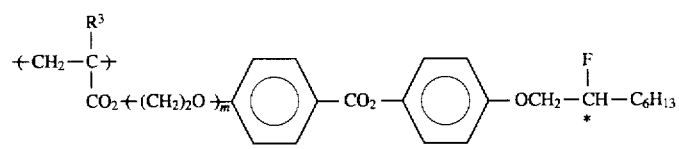 (1-C)
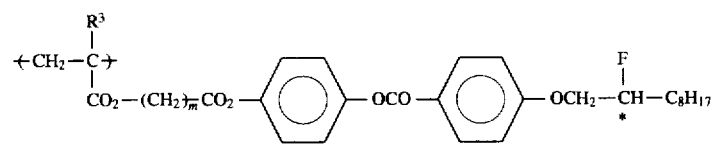 (1-D)
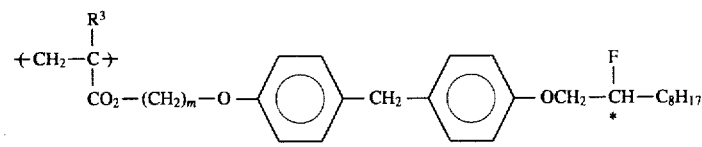 (1-E)
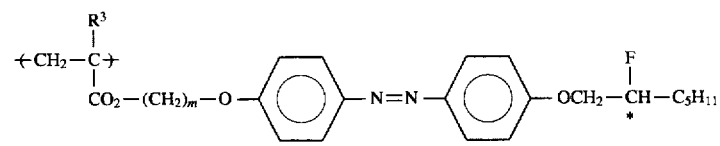 (1-F)
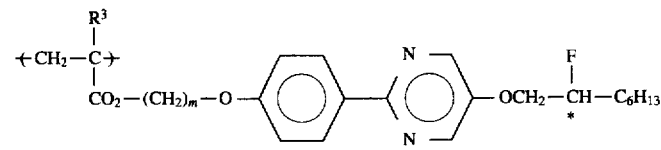 (1-G)
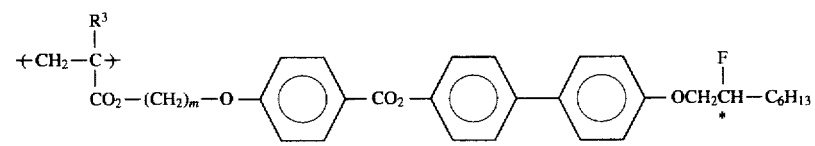 (1-H)
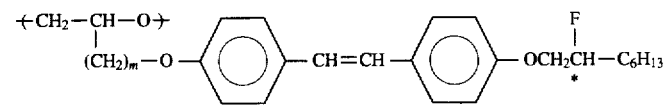 (1-I)
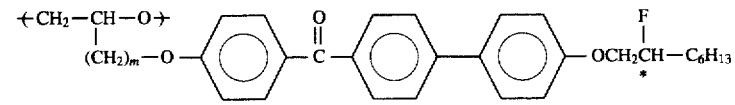 (1-J)

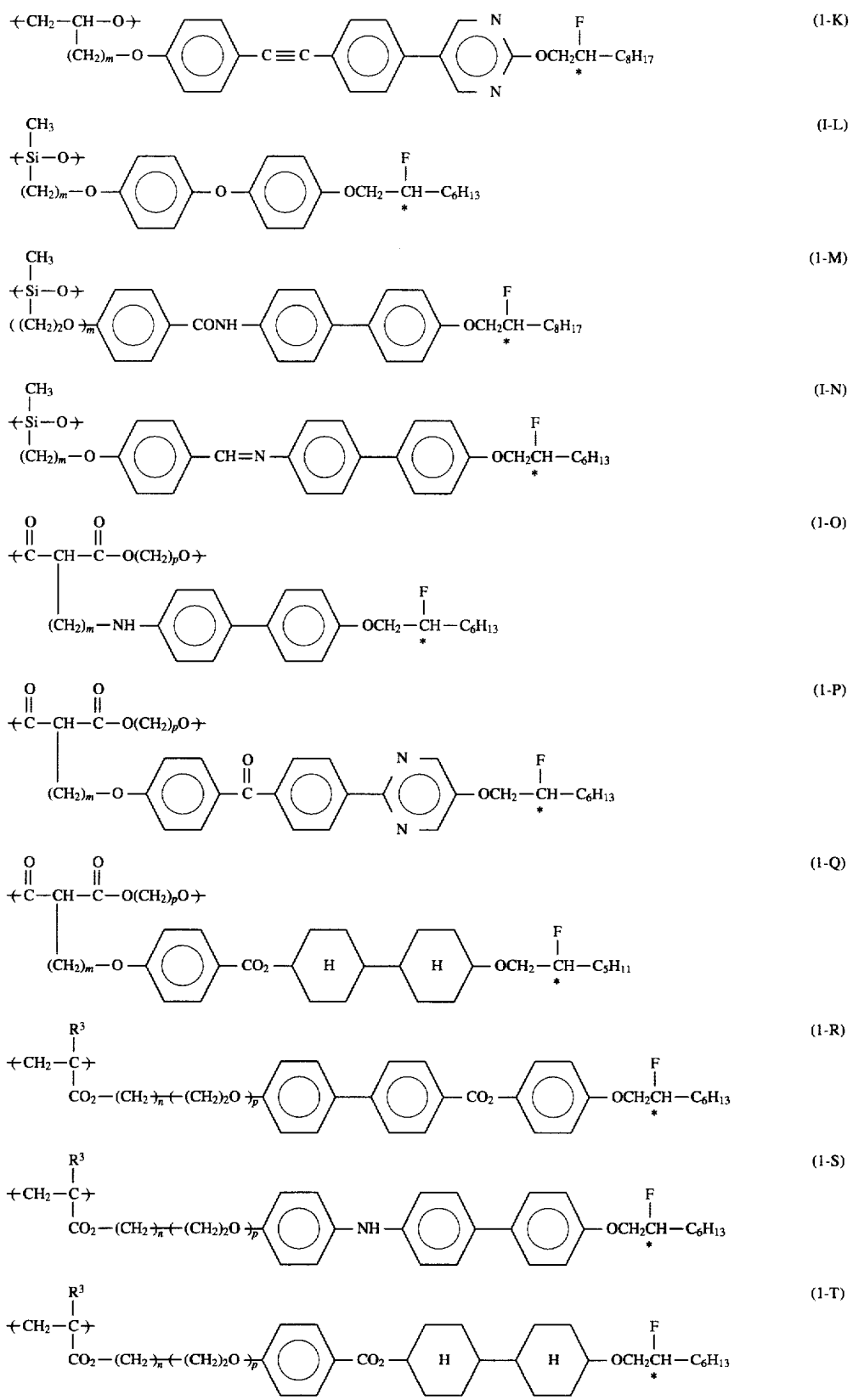

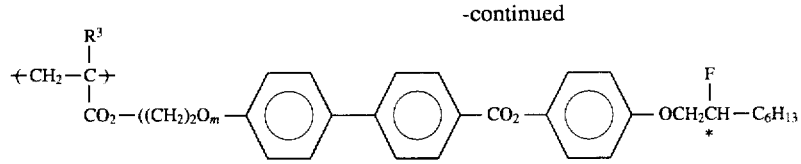
(1-U)
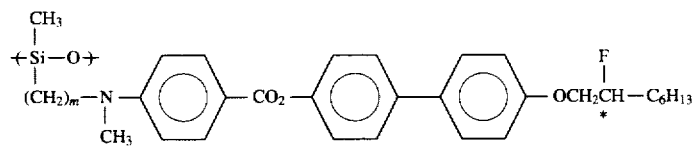
(1-V)
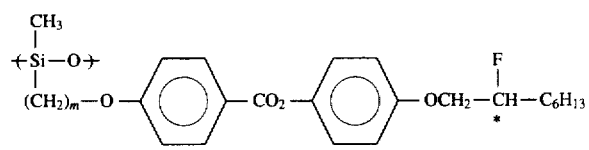
(1-W)
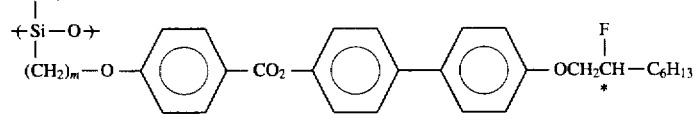
(1-X)
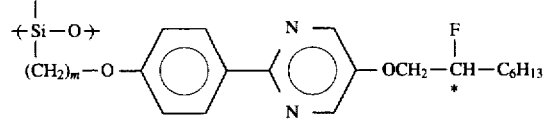
(1-Y)
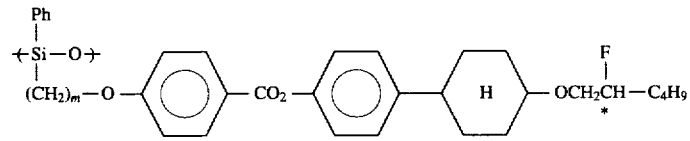
(1-Z)
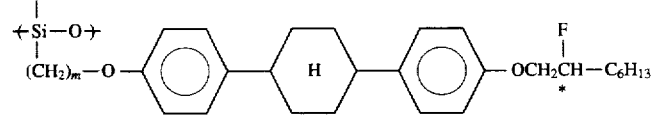
(1-a)
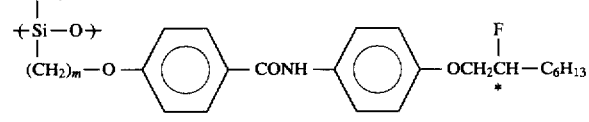
(1-b)
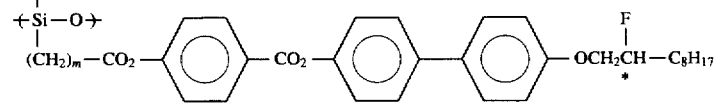
(1-c)
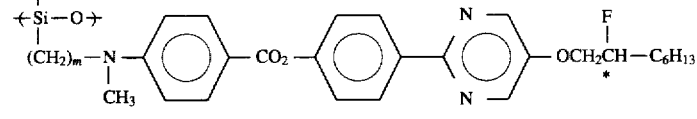
(1-d)
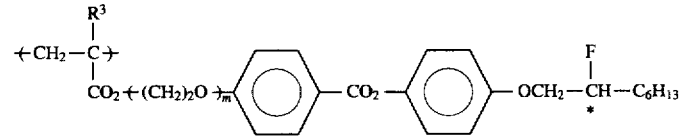
(1-e)

-continued
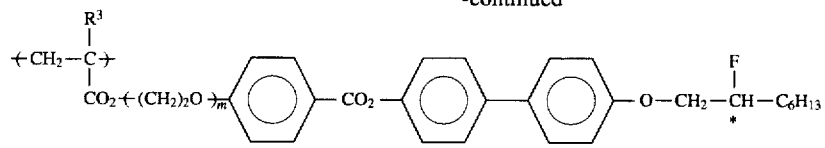 (1-f)
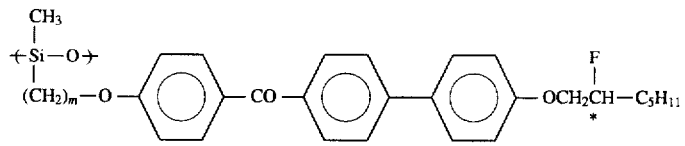 (1-g)
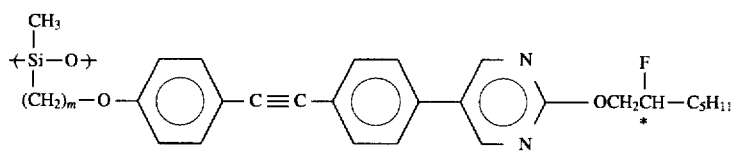 (1-h)
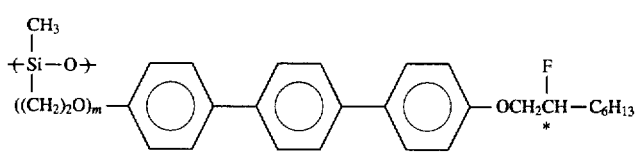 (1-i)
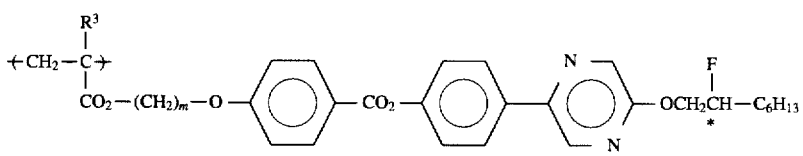 (1-j)
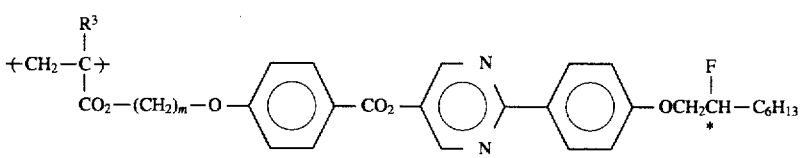 (1-k)
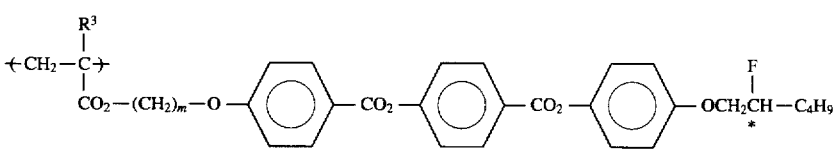 (1-l)
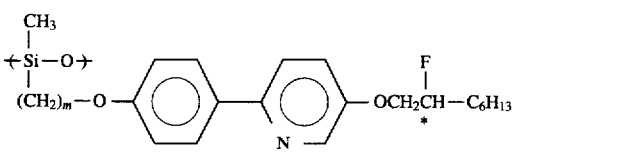 (1-m)
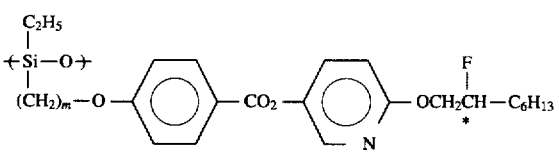 (1-n)
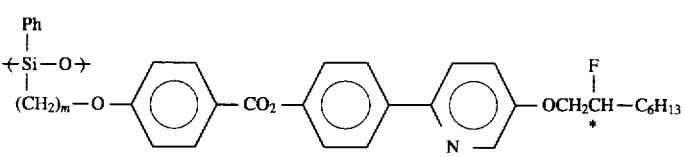 (1-o)

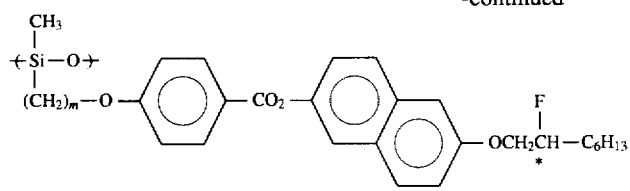
(1-p)
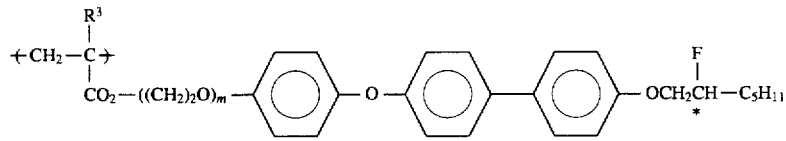
(1-q)
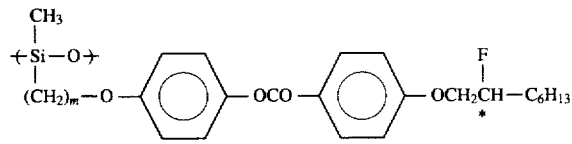
(1-r)
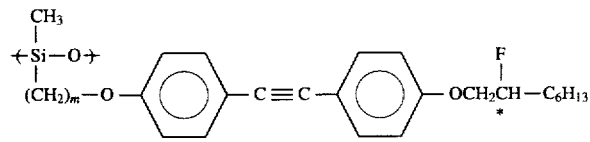
(1-s)
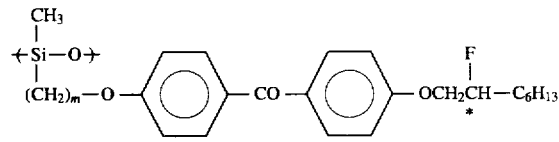
(1-t)
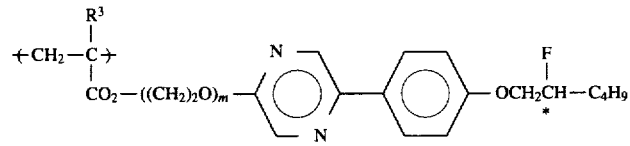
(i-u)
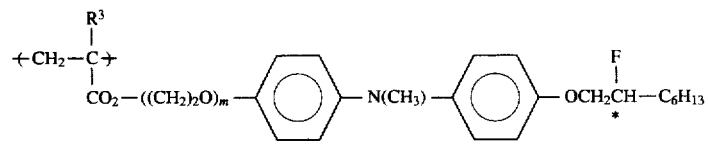
(1-v)
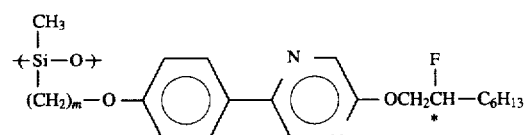
(1-w)
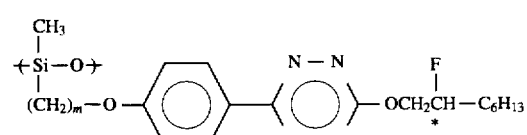
(1-x)
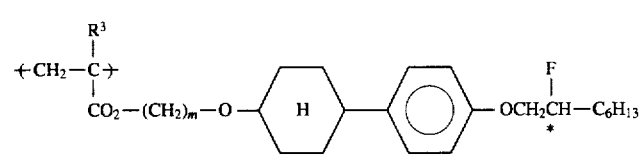
(1-y)

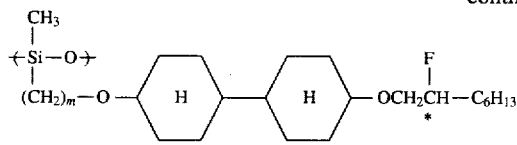

In the above formulas, $R^3$ represents a hydrogen atom or an alkyl group;

m represents an integer of 0 to 30;
n represents an integer of 0 to 30;
p represents an integer of 0 to 30;
Ph represents a phenyl group.

The optically active polymeric liquid-crystal compound of the present invention can be produced by subjecting a monomer to radical polymerization, or anionic or cationic polymerization in the case of, for example, a polymeric liquid-crystal compound of a polyvinyl type, subjecting a diol and a dicarboxylic acid to condensation polymerization in the case of, for example, a polymeric liquid-crystal compound of a polyester type, or adding a side chain moiety having a vinyl group to a polymethylhydrogenesiloxane main chain by graft polymerization in the case of, for example, a polymeric liquid-crystal compound of a polysiloxane type.

The polymeric liquid-crystal compound of the present invention, produced in the manner as exemplified above, may preferably have a number average molecular weight of from 2,000 to 1,000,000, and more preferably from 4,000 to 500,000. An average molecular weight of less than 2,000 may often bring about difficulties in film properties of the polymeric liquid-crystal compound or film forming properties required for a coating film. An average molecular weight of more than 1,000,000 may often result in a poor response to an external field, with an increase in viscosity.

The method of producing the polymeric liquid-crystal compound of the present invention is by no means limited to the above methods.

The polymeric liquid-crystal compound thus obtained is useful as a material for optoelectronics. It should be comprised of a chiral smectic phase from the viewpoints of a very quick response and a liquid crystal having a bistable state with memory performance.

The polymeric liquid-crystal compound of the present invention is characterized by the employment of

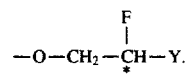

(Y is a substituted or unsubstituted alkyl group), which is a structure bonded to the mesogen X in ether linkage and comprises an asymmetric carbon atom having a fluorine atom through a methylene carbon. This structure can be synthesized from optically active intermediates such as a 2-fluoroalkanol, disclosed in the specification of Japanese Patent Application No. 232886/1985. For example, the polymeric liquid-crystal compound of the present invention can be obtained from these optically active intermediates though the synthesis route as shown below.

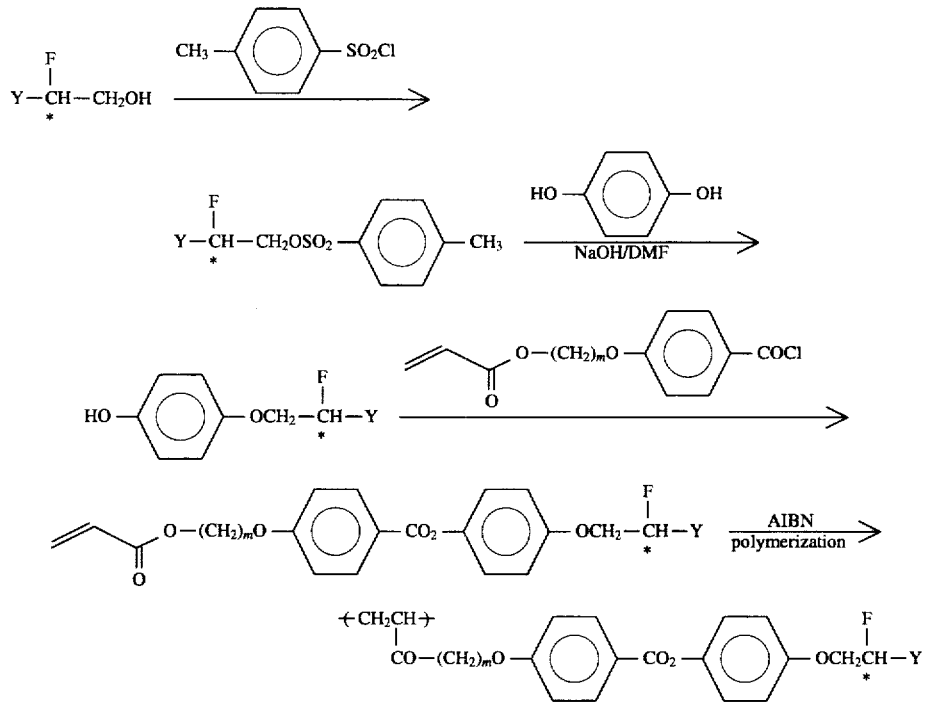

The chiral smectic polymeric liquid-crystal compound of the present invention, synthesized in the manner as exemplified above, has a structure in which the moiety

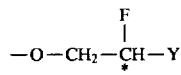

is bonded to the mesogen ring structure, and hence exhibits a great spontaneous polarization. Its direction is minus with a very few exception, according to the definition by N. A. Clark et al in Ferroelectrics, vol. 59, p. 25, 1984.

The fact that the spontaneous polarization is in the minus direction is a characteristic feature in view of the tendency that a chiral smectic polymeric liquid-crystal compound having the structure that

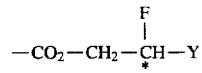

is bonded to a mesogen ring structure, which is derived from the same 2-fluoroalkanol, exhibits spontaneous polarization in the plus direction.

So far as the compound has the repeating unit represented by Formula (I), it can be of course applied as a polymeric liquid-crystal copolymer compound. Such a compound is a copolymer compound having the repeating unit represented by Formula (I) and at least one of other repeating units. The structure of Formula (I) includes the structures of from (1-A) to (1-f) previously set forth, and the other structure having other repeating unit for copolymerization includes the following examples:

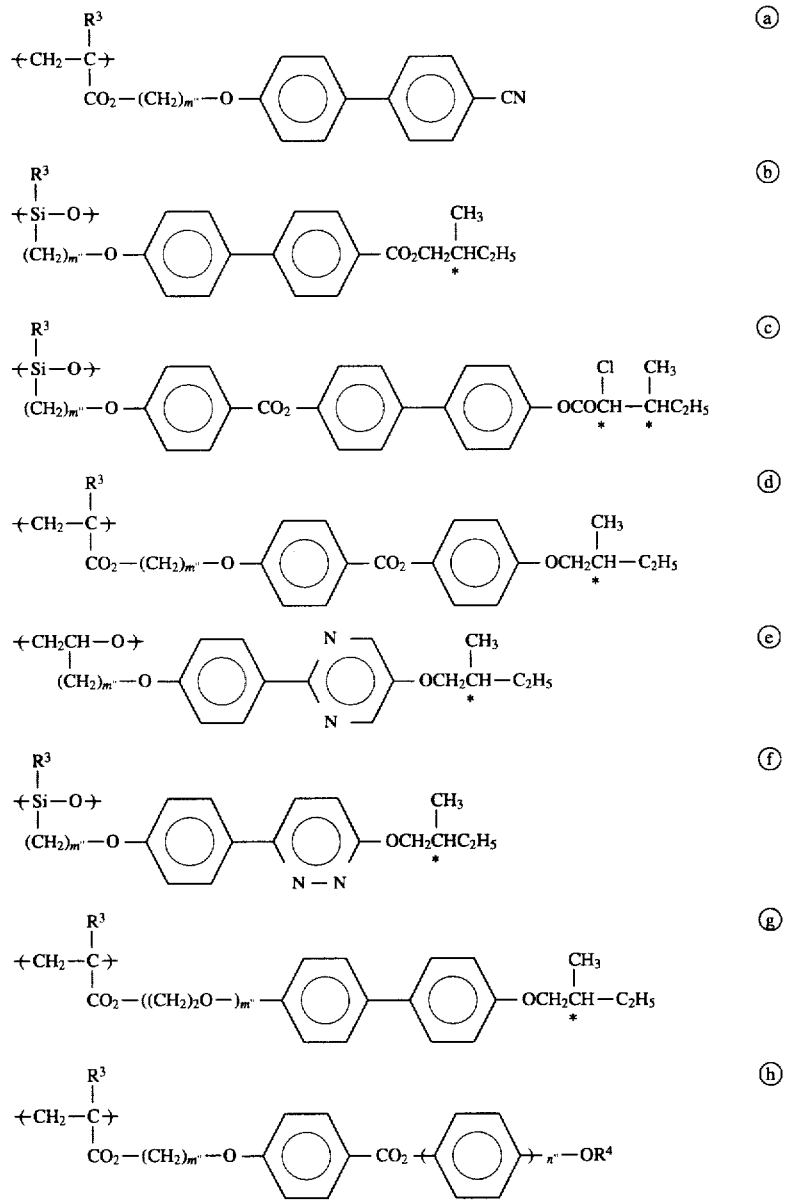

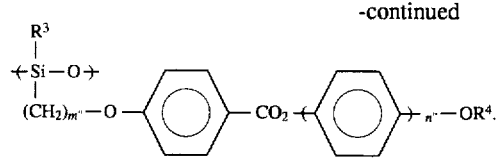

wherein R3 represents a hydrogen atom, an alkyl group, a phenyl group or a halogen atom, m" represents an integer of 0 to 30, and $R^4$ represents an alkyl group, n" represents an integer of 1 to 3.

The optically active polymeric liquid-crystal copolymer compound of the present invention can be produced by subjecting a plural types of monomers to radical polymerization, or anionic or cationic polymerization in the case of, for example, a polymeric liquid-crystal copolymer compound of a polyvinyl type, subjecting a plural types of diols and dicarboxylic acids to condensation polymerization in the case of, for example, a polymeric liquid-crystal copolymer compound of a polyester type, or adding a plural types of side chain moieties having vinyl groups to a polymethylhydrogenesiloxane main chain by graft polymerization in the case of, for example, a polymeric liquid-crystal copolymer compound of a polysiloxane type.

The polymeric liquid-crystal copolymer compound of the present invention, produced in the manner as exemplified above, may preferably have a number average molecular weight of from 2,000 to 1,000,000, and more preferably from 4,000 to 500,000. An average molecular weight of less than 2,000 may often bring about difficulties in film properties of the polymeric liquid-crystal copolymer compound or film forming properties required for a coating film. An average molecular weight of more than 1,000,000 may often result in a poor response to an external field, with an increase in viscosity.

The method of producing the polymeric liquid-crystal copolymer compound of the present invention is by no means limited to the above methods.

The copolymer compound of the present invention may preferably contain the repeating unit represented by Formula (I) in an amount of not less than 5 mol %, and more preferably not less than 10 mol An amount less than 5 mol % may often result in a poor response because of, e.g., a small spontaneous polarization. The copolymer compound of the present invention has the same excellent characteristics as those of the compound of the first invention, and on the other hand has the advantage that it has the features of the plural types of repeating units, and yet is a homogeneous and uniform compound.

Such a polymeric liquid-crystal compound (including the polymeric liquid-crystal copolymer compound) of the present invention can be made more characteristic when it is made into a blend composition which is the second invention of the present invention.

The second invention of the present invention is a polymeric liquid-crystal composition comprising as a blend component at least one of the polymeric liquid-crystal compound having the repeating unit represented by the above Formula (I). Other blend component includes, for example, polymeric compounds, low-molecular compounds, polymeric liquid crystals, and low-molecular liquid crystals.

In the polymeric liquid-crystal compound, as having the characteristic features as described above, the spontaneous polarization can not be cancelled even when the compound is blended with a liquid crystal compound having the minus direction for the spontaneous polarization, and can be particularly effective. The polymeric liquid crystals or low-molecular liquid crystals that exhibit spontaneous polarization in the minus direction include the following:

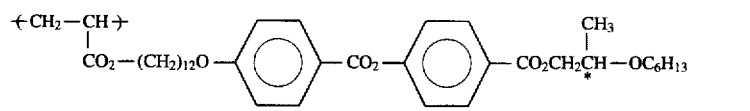

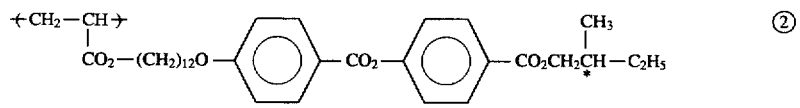

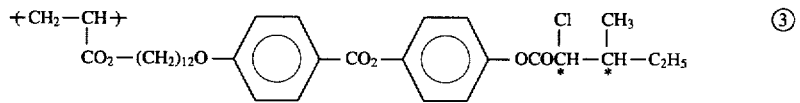

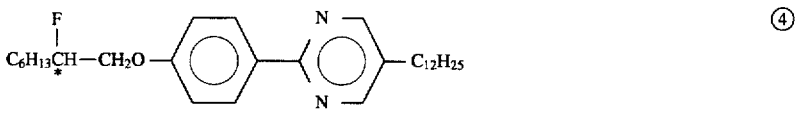

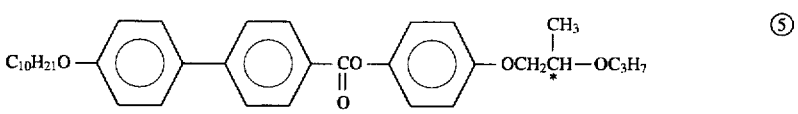

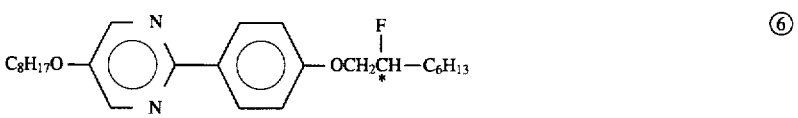

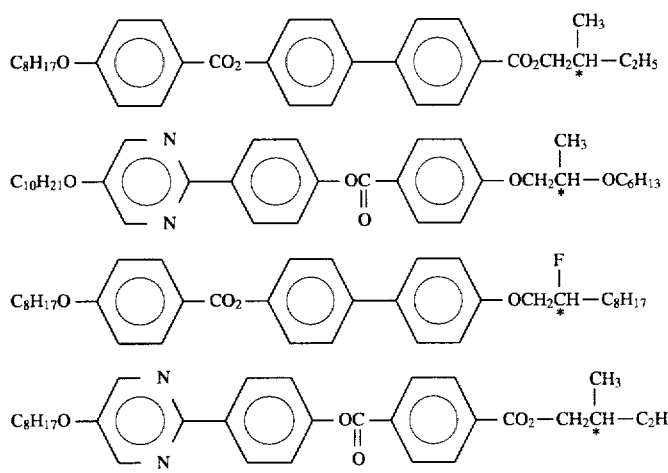

A polymeric liquid-crystal compound having a repeating unit represented by the following Formula (II), having the chiral structure derived from D-lactic acid as shown in the formula ①, has the tendency that its spontaneous polarization is in the minus direction, and is particularly preferred when blended with the polymeric liquid-crystal compound of the present invention, having the repeating unit represented by Formula (I).

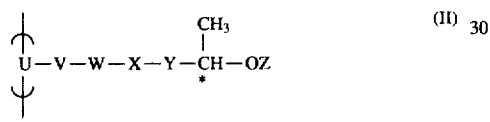

wherein U represents a polymer main chain; V represents —$(CH_2)_m$—, —$((CH_2)_2$—$O)_m$— or —$(CH_2)_n$—$((CH_2)_2$—$O)_p$—, one or more of methylene hydrogen atoms of which may be substituted with an alkyl group, a halogen atom, a cyano group, an amino group or a carbonyl group, and m, n and p each represents an integer of 0 to 30; W represents a single bond, —O—, —OCO—, —COO—, —$CONR^1$—, —CO— or —$NR^1$, where $R^1$ represents a hydrogen atom or an alkyl group; X represents two or more rings of a substituted or unsubstituted aliphatic or aromatic rings of benzene ring, heteroaromatic ring or condensed ring, which rings are bonded through a single bond, —O—, —OCO—, —COO—, —$(CH_2)_q$—, —N=N—, —$(CH=CH)_q$—, —CH=N—, —$(C\equiv C)_q$—, —$CONR^1$—, —$(CO)_q$— or —$NR^1$—, where q represents an integer of 1 to 10; Y represents —$(CH_2)_r$—, —$CO(CH_2)_r$—, —$CO_2(CH_2)_r$—, —$O(CH_2)_r$— or —OCO—, where r represents an integer of 1 to 3; Z represents —$R^2$ or —$COR^2$, where $R^2$ represents a substituted or unsubstituted alkyl group; and the mark * represents an asymmetric carbon atom.

The above compound specifically include the following:

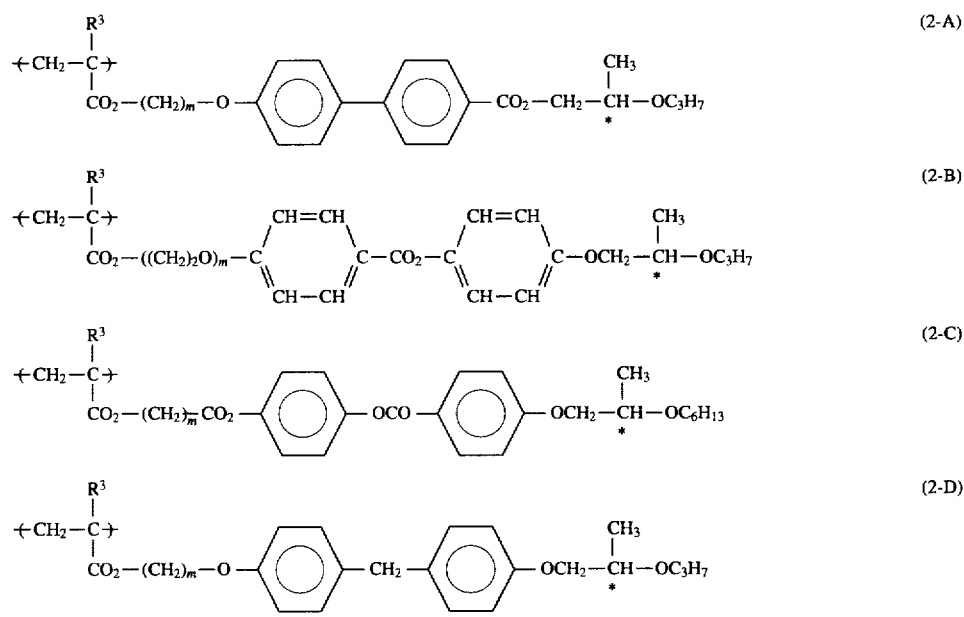

-continued
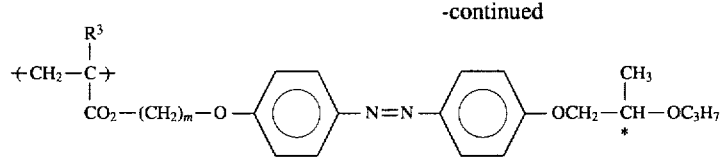 (2-E)
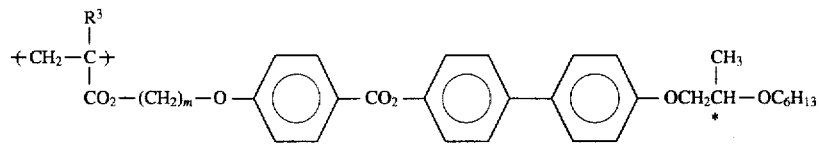 (2-F)
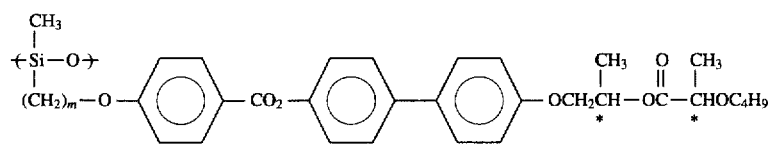 (2-G)
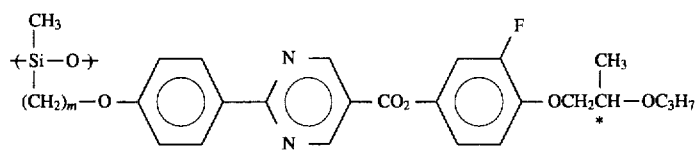 (2-H)
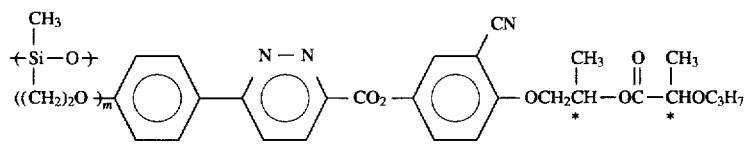 (2-I)
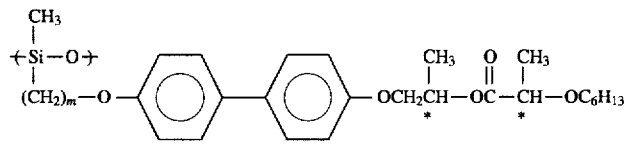 (2-J)
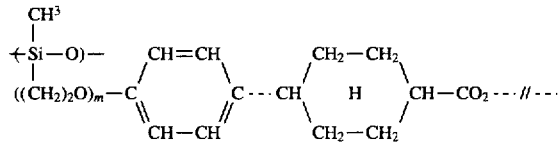 (2-K)
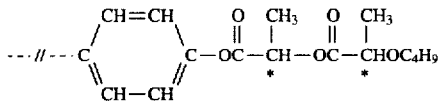
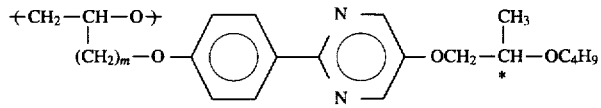 (2-L)
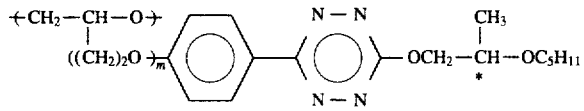 (2-M)
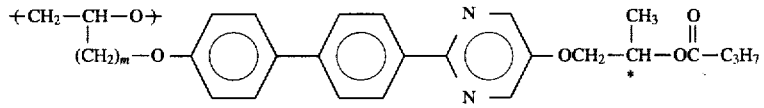 (2-N)
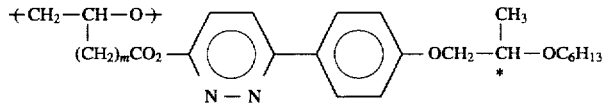 (2-O)

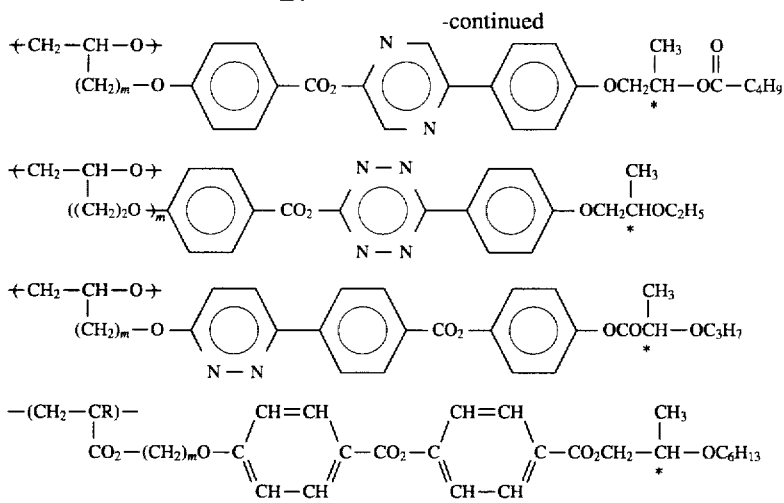

Wherein R3 represents a hydrogen atom or an alkyl group, m represents an integer of 1 to 30.

In the polymeric liquid-crystal composition, the polymeric liquid-crystal compound having the repeating unit represented by Formula (I) should be contained in usually an amount of not less than 5 wt. %, and preferably in an amount of not less than 10 wt. %. An amount less than 5 wt. % may often result in a decrease in the advantages on the physical properties such as spontaneous polarization.

The third invention of the present invention is a polymeric liquid-crystal device making use of the polymeric liquid-crystal compound having the repeating unit represented by Formula (I) or the polymeric liquid-crystal composition containing the compound.

The polymeric liquid-crystal device of the present invention comprises a substrate made of any material such as glass, a plastic or a metal, and the polymeric liquid-crystal compound or polymeric liquid-crystal composition of the present invention, formed on the substrate by coating or the like of a film. It is possible to form on the substrate a transparent electrode comprising ITO or the like or an electrode formed into a pattern.

Figure 1B:
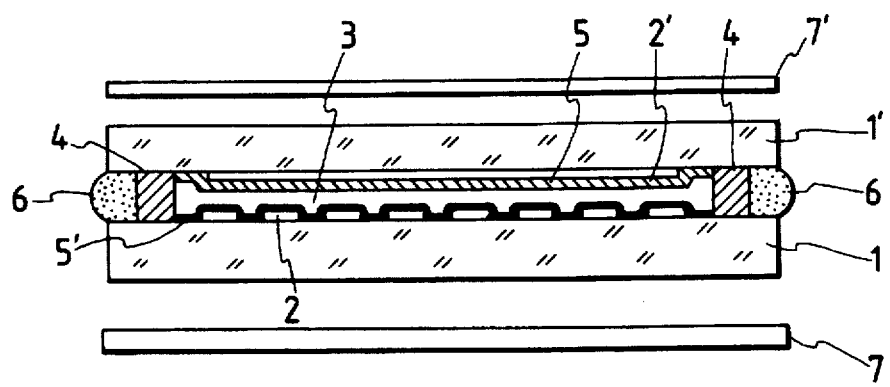

FIGS. 1A and 1B (FIG. 1B is a cross section along the line A—A' in FIG. 1A) illustrate an example in which the polymeric liquid-crystal of the present invention is applied in a display device. A pair of substrates 1 and 1' comprised of glass sheets or plastic sheets (at least one of the substrates has double refraction) are held with a spacer 4 to have a given space. A pair of the substrates 1 and 1' are adhered with an adhesive 6 so that they are sealed to give a cell structure. On the substrate 1', a group of electrodes (for example, a group of electrodes for applying a scanning voltage, in a matrix electrode structure) comprised of a plurality of transparent electrodes 2' are formed in a given pattern, for example, in a stripe pattern. On the substrate 1, a group of electrodes (for example, a group of electrodes for applying a signal voltage, in a matrix electrode structure) comprised of a plurality of transparent electrodes 2 are formed across the above transparent electrodes 2'.

The substrates 1' and 1 provided with such transparent electrodes 2' and 2, respectively, can be provided thereon with alignment control films 5 and 5' formed into films by the use of an inorganic insulating material as exemplified by silicon monoxide, silicon dioxide, aluminum oxide, zirconia, magnesium fluoride, cerium oxide, cerium fluoride, silicon nitride, silicon carbide or boron nitride, or organic insulating material as exemplified by polyvinyl alcohol, polyimide, polyamide imide, polyester imide, polyparaxylylene, polyester, polycarbonate, polyvinyl acetal, polyvinyl chloride, polyamide, polystyrene, cellulose resin, melamin resin, urea resin or acrylic resin.

The alignment control films 5 and 5' can be obtained by forming the above inorganic insulating material or organic insulating material into films and thereafter rubbing their surfaces with velvet, cloth or paper in one direction.

In another preferred embodiment of the present invention, the alignment control films 5 and 5' can also be obtained by forming an inorganic insulating material such as SiO or SiO into films on the substrates 1' and 1, respectively, by oblique vacuum deposition.

In still another embodiment, the above inorganic insulating material or organic insulating material may be formed into films on the surfaces of substrates 1' and 1 made of glass or plastics or on the substrates 1' and 1 and thereafter the surfaces of the films may be etched by oblique etching, so that an effect of alignment control can be imparted to the surfaces.

The above alignment control film 5 may preferably also function as an insulating film at the same time. For this purpose, the alignment control film 5 may be set to have a film thickness usually of from 100 Å to 1 μm, and preferably from 500 Å to 5,000 Å. This insulating layer can also be advantageous in that it can prevent a current from being generated because of impurities contained in a small quantity in a polymeric liquid-crystal display layer. Hence, the liquid crystal compound is not deteriorated even after repeated operations.

In the display device of the present invention, the alignment control film may be provided only on one side of the surface of the substrate 1 or 1', coming into contact with the display layer containing the polymeric liquid-crystal compound.

The above ferroelectric polymeric liquid-crystal and the composition containing it can not only be aligned by the method in which the alignment control film is used, but also well aligned by the following methods for alignment or orientation. Prefered as methods that can surely carry out molecular orientation are orientation methods such as monoaxial streching, biaxial streching and inflation streching, or re-alignment by sharing. A material having no film properties by itself may be stretched together with other films between which it is sandwiched. Desired orientation can thus be obtained.

Polymer films that can be used as the substrates 1 and 1' include the following, to which, however, the kinds of films are by no means limited.

They include a low-density polyethylene film, a high-density polyethylene film (such as Hibron, a product of Mitsu Toatsu Chemicals, Inc.), a polyester film (such as Torefan, a product of Toray Industries, Inc.), a polyester film (such as Myler, a product of Du Pont), a polyvinyl alcohol film (such as Hicellon, a prodcut of Nihon Gosei Kako Co., Ltd.), a polyamide film (Rayfan, a product of Toyo Gosei Film Co.), a polycarbonate film (such as Teijin Panlite, a product of Teijin Limited) a polymidie film (such as KAPTON, a product of Du Pont), a polyvinyl chloride film (such as Hishilex, a product of Mitsubishi Jushi Engineering Co., Ltd.), a polytetrafluoroethylene film (such as Teflon, a product of Mitsui Fluorochemical Co.), a polyacrylate film (such as Sumilite, a product of Sumitomo Bakelite Co., Ltd.), a polystyrene film (such as Styrosheet, a product of Asahi Dow Co., Ltd.), a polyvinylidene chloride film (such as Saran Film, a product of Asahi Dow Co., Ltd.), a cellulose film, a polyvinylidene fluoride film (such as Tedler, a product of Du Pont).

In the present invention, polarizing films, polarized beam splitters, etc. can be used as polarizers 7 and 7'.

In the display device of the present invention, a thermal head or a laser beam can be used in the case when the display is performed by utilizing the effect of heating.

As a laser beam source, it is desirable to use a gas laser such as a He—Ne laser, an $Ag^+$ laser or a $N_2$ laser, a solid laser such as a rubby laser, a glass laser or a YAG laser, or a semiconductor laser. Particularly preferably used is a semiconductor laser having a wavelength region of from 600 nm to 1,600 nm. More particularly preferably used is a semiconductor laser having a wavelength region of from 600 nm to 900 nm.

The wavelengths can be shortened by using the second harmonic or the third harmonic of laser beams of these.

In the case when the laser beams are used, a light absorbing layer may be additionally provided, or a light absorbing agent may be dispersed or dissolved in the display layer. If the light absorbing layer or the light absorbing agent may have an influence on the display surface, it is desirable to use materials having no absorption at the visible light region.

Examples of laser beam absorbing compounds that may be added to the polymeric liquid-crystal layer are azo compounds, bisazo compounds, trisazo compounds, anthraquinone compounds, naphthoquinone compounds, phthalocyanine compounds, naphthalocyanine compounds, tetrabenzoporphyrin compounds, aluminum salt compounds, diimonium salt compounds, and metal chelate compounds.

Of the above laser beam absorbing compounds, compounds for a semiconductor laser beam have an absorption at the near infrared region, are useful as stable light absorbing coloring matters, and have good solubility or dispersibility with polymeric liquid-crystal compounds. Some of them have dichroism. The compounds having dichroism may be mixed in the polymeric liquid-crystal, whereby it becomes possible to obtain a memory or display medium of a thermally stable host-guest type.

Two or more kinds of the above compounds may be contained in the polymeric liquid-crystal compound.

Any of the above compounds may also be used in combination with other near infrared absorbing dye or a dichroic coloring matter. Typical examples of the near infrared absorbing dye are coloring matters such as cyanine, merocyanine, phthalocyanine, tetrahydrocholine, dioxazine, anthraquinone, triphenodithiazine, xanthene, triphenylmethane, pyrylium, croconium, azulene, and triphenylamine.

The above compounds may be added in the polymeric liquid-crystal compound in an amount of from about 1 to about 20% by weight, and preferably from 0.5 to 10% by weight.

The polymeric liquid-crystal compound used in the present invention is a polymeric thermotropic liquid crystal, and utilizes an intermediate phase, i.e., a nematic, smectic, or chiral smectic or cholesteric phase.

The polymeric liquid-crystal device obtained in the present invention can be used not only as the display device as described above, but also as a memory device or the like that can achieve large-area display. In order to realize bistable states, there is a method of making a film thickness small to eliminate a spiral, which film thickness should specifically be not more than 10 μm.

The polymeric liquid-crystal device obtained in this way, comprising the polymeric liquid-crystal compound of the present invention or the polymeric liquid-crystal composition containing the polymeric liquid-crystal compound, can readily achieve good response characteristics and large-area display, and hence can be widely applied in the field of optoelectronics such as memories and display devices.

The optically active polymeric liquid-crystal compound of the present invention has superior response characteristics, and can be blended with other various polymeric liquid-crystal compounds and low-molecular liquid-crystal compounds to form a composition with a good response.

The polymeric liquid-crystal device that employs the polymeric liquid-crystal compound of the present invention or the polymeric liquid-crystal composition containing the polymeric liquid-crystal compound can readily achieve large-area device, and is useful as a display or memory medium.

EXAMPLES

The present invention will be described below in greater detail by giving Examples. The present invention is by no means limited to these.

Example 1

1. Synthesis of

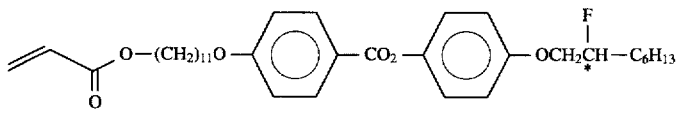

a) Synthesis of 4-(2-fluorooctyloxy)phenol:

In 100 ml of DMF, 3.83 g (160 mmol) of NaH was added, and a DMF solution of 14.6 g (133 mmol) of hydroquinone was further added below 5° C. To the mixture, 20.1 g (66.7 mmol) of a tosylated compound obtained by tosylating 2-fluorooctanol with tosyl chloride was added, and the resulting mixture was stirred at 100° C. for 7 hours. DMF was evaporated, and then 200 ml of methylene chloride was added together with diluted hydrochloric acid, followed by extraction with methylene chloride. The extracted material, from which the solvent had been removed, was subjected to silica gel chromatography to give 7.30 g of the desired product.

b) In 50 ml of toluene, 5.88 g (16.3 mmol) of 4-(11-acryloyloxyundecanyloxy)benzoic acid, 9.67 g (81.3 mmol) of $SOCl_2$ and a trace amount of 2,6-di-t-butyl-4-methylphenol were refluxed with heating for 2 hours, and thereafter the toluene and remaining $SOCl_2$ were evaporated. The resulting product, after dissolved in anhydrous benzene, was dropwise added at 0° C. in a solution obtained by dissolving 3.00 g (12.5 mmol) of 4-(2-fluorooctyloxy)phenol in anhydrous benzene and anhydrous pyridine. The mixture was stirred at room temperature for 1 hour, and at 45° C. for 18 hours, followed by addition of diluted hydrochloric acid and then extraction with ethyl acetate. The extracted material, from which the solvent had been removed, was subjected to silica gel chromatography and further recrystallized with benzene/n-hexane to give 3.65 g of the desired product.

2. Synthesis of polymer (1) (an instance in which in the compound (1-A) $R^3$ is a hydrogen atom and m is 11):

Synthesis of

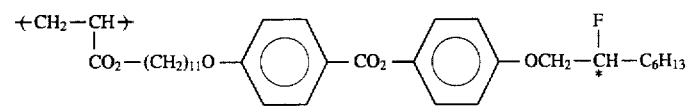

In 10 ml of anhydrous toluene, 1.00 g of the monomer obtained in the above 1. was deaerated in vacuum. Thereafter, the monomer thus treated was subjected to radical polymerization at 70° C. for 20 hours together with 5.12×10 mol of AIBN. Reprecipitation was repeated using methanol, followed by drying to give 0.63 g of a polymer (1).

Phase transition temperature (°C.) measured with DSC (Perkin-Elmer DSC7):

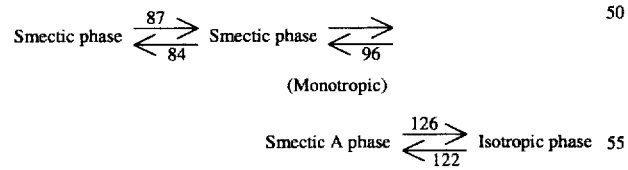

Number average molecular weight (in terms of polystyrene) measured by GPC was found to be 11,000.

Example 2

A composition comprising the polymer (1) of Example 1 and the following polymer (2) (in the compound (2-A) $R^3$ is a hydrogen atom and m is 12) was prepared by dissolving these polymers in a common solvent (chloroform), followed by evaporation of the solvent. Compositional ratio and phase transition behavior of the resulting composition (a) are shown in the following Table 1.

Polymer (2):

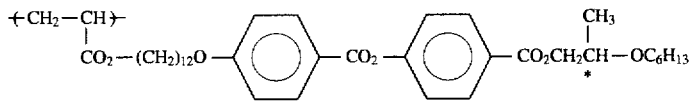

Number average molecular weight: 8,200

Chiral smectic C phase $\xrightarrow{15°C.}$

Smectic A phase $\xrightarrow{71°C.}$ Isotropic phase

TABLE 1

| | (1)/(2) weight ratio | Phase transition behavior (°C.) |
|---|---|---|
| Composition (a) | 8/2 | S $\xrightarrow{80}$ $S_C*$ $\xrightarrow{90}$ $S_A$ $\xrightarrow{116}$ Iso. |

Example 3

Compositions (b) to (d) comprising the polymer (1) of Example 1 and the following low-molecular liquid crystal A (the compound (5)) were prepared in the same manner as in Example 2. Compositional ratios and phase transition behavior of the resulting compositions are shown in the following Table 2. Low-molecular liquid crystal A (the compound (5)):

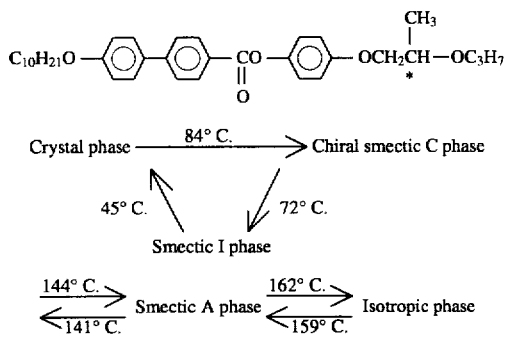

TABLE 2

| Composition | (1)/A weight ratio | Phase transition behavior (°C.) |
|---|---|---|
| (b) | 7.5/2.5 | Cryst $\xrightarrow{42}$ S $\xrightarrow{80}$ S$_C$* $\xrightarrow{111}$ S$_A$ $\xrightarrow{158}$ Iso. |
| (c) | 5/5 | S $\xrightarrow{81}$ S$_C$* $\xrightarrow{108}$ S$_A$ $\xrightarrow{148}$ Iso. |
| (d) | 2.5/7.5 | S $\xrightarrow{81}$ S$_C$* $\xrightarrow{102}$ S$_A$ $\xrightarrow{135}$ Iso. |

Example 4

The compositions obtained in Examples 2 and 3 were each injected into a liquid crystal cell having a thickness of 3 μm between glass substrates provided with a transparent electrode comprising ITO on which a polyimide alignment film was formed, and was oriented by annealing. An electric field of 10 V/μm was applied to the composition at a temperature of S$_C$* phase, so that a molecular inversion taking place according to the electric field was observed. At his time, the direction of spontaneous polarization of the composition (b) was found to be minus, according to the definition of N. A. Clark et al. Table 3 shows the response speed and the spontaneous polarization of the compositions (a) to (d).

TABLE 3

| Composition | Response speed (ms) | Spontaneous polarization (nC/cm$^2$) |
|---|---|---|
| (a) | 12.0 | 8 |
| (b) | 8.4 | 15 |
| (c) | 7.3 | 10 |
| (d) | 5.0 | 9 |

Example 5

Compositions comprising the polymeric liquid-crystal (1-I) (m=9) as set forth in the specification and the low-molecular liquid crystal A in Example 3 (the compound (5)) were prepared in the same manner as in Example 3, and the response speed of these was examined in the same manner as in Example 4. Results obtained are shown in Table 4.

TABLE 4

| Composition | (1-I):A | Response speed (ms) |
|---|---|---|
| (e) | 7.5:2.5 | 2.3 |
| (f) | 6:4 | 2.1 |
| (g) | 5:5 | 2.0 |
| (h) | 4:6 | 1.8 |
| (i) | 3:7 | 1.6 |

Example 6

Compositions comprising the polymeric liquid-crystal (1-J) (m=9) as set forth in the specification and the low-molecular liquid crystal (6) as set forth therein were prepared in the same manner as in Example 3, and the response speed of these was examined in the same manner as in Example 4. Results obtained are shown in Table 5.

TABLE 5

| Composition | (1-J):(6) | Response speed (ms) |
|---|---|---|
| (j) | 7:3 | 1.8 |
| (k) | 6:4 | 1.2 |
| (l) | 5:5 | 1.1 |
| (m) | 4.5:5.5 | 1.1 |
| (n) | 3.5:6.5 | 0.7 |

Example 7

Compositions comprising the polymeric liquid-crystal (1-U) (m=4, R$^3$=H) as exemplified in the specification and the low-molecular liquid crystal A of Example 3 (the compound (5)) were prepared in the same manner as in Example 3, and the response speed of these was examined in the same manner as in Example 4. Results obtained are shown in Table 6.

TABLE 6

| Composition | (1-U):A | Response speed (ms) |
|---|---|---|
| (o) | 5:5 | 2.1 |
| (p) | 3:7 | 2.0 |
| (q) | 2:8 | 1.2 |

Example 8

Compositions comprising the polymer (1) (1-A) and the polymer (2-F) (m=11, R$^3$=H) as exemplified in the specification were prepared in the same manner as in Example 2, and the response speed of these was examined in the same manner as in Example 4. Results obtained are shown in Table 7.

TABLE 7

| Composition | (1):(2-F) | Response speed (ms) |
|---|---|---|
| (r) | 6.5:3.5 | 3.1 |
| (s) | 4:6 | 3.4 |
| (t) | 2:8 | 2.8 |
| (u) | 1:9 | 3.8 |

Example 9

Compositions comprising the polymeric liquid-crystal (1-U) (m=4, R$^3$=H) as exemplified in the specification and the polymeric liquid crystal (2-F) as exemplified in the specification were prepared in the same manner as in Example 2, and the response speed of these was examined in the same manner as in Example 4. Results obtained are shown in Table 8.

TABLE 8

| Composition | (1-U):(2-F) | Response speed (ms) |
|---|---|---|
| (v) | 4:6 | 3.9 |
| (w) | 3:7 | 4.2 |
| (x) | 2:8 | 3.2 |

Example 10

Compositions comprising the polymeric liquid-crystal (1-V) (m=11) as exemplified in the specification and the polymeric liquid crystal (2-F) as exemplified in the specification were prepared in the same manner as in Example 2, and the response speed of these was examined in the same manner as in Example 4. Results obtained are shown in Table 9.

TABLE 9

| Composition | (1-V):(2-F) | Response Speed (ms) |
|---|---|---|
| (y) | 6:4 | 7.8 |
| (z) | 5:5 | 6.4 |
| (A) | 4:6 | 3.9 |
| (B) | 2:8 | 3.9 |

Example 11

Compositions comprising the polymeric liquid-crystal (1-W) (m=11) as exemplified in the specification and the low-molecular liquid crystal (6) as set forth in the specification were prepared in the same manner as in Example 2, and the response speed of these was examined in the same manner as in Example 4. Results obtained are shown in Table 10.

TABLE 10

| Composition | (1-W):(6) | Response speed (ms) |
|---|---|---|
| (C) | 2:8 | 0.6 |
| (D) | 4:6 | 0.8 |

Example 12

Compositions comprising the polymeric liquid-crystal (1-X) (m=11) as exemplified in the specification and the polymeric liquid-crystal (2-F) (m=11, $R^3$=H) as set forth in the specification were prepared in the same manner as in Example 2, and the response speed of these was examined in the same manner as in Example 4. Results obtained are shown in Table 11.

TABLE 11

| Composition | (1-X):(2-F) | Response speed (ms) |
|---|---|---|
| (E) | 8:2 | 0.8 |
| (F) | 5:5 | 1.2 |

Example 13

A composition comprising the polymeric liquid-crystal (1-e) (m=4, $R^3$=H) as set forth in the specification and the polymeric liquid-crystal (3) as set forth in the specification was prepared in the same manner as in Example 2, and the response speed thereof was examined in the same manner as in Example 4. Results obtained are shown in Table 12. This composition responded to the electric field at room temperature.

TABLE 12

| Composition | (1-e):(3) | Response speed (ms) |
|---|---|---|
| (G) | 3:7 | 1.8 |

Example 14

A composition comprising the polymeric liquid-crystal (1-e) (m=4, $R^3$=H) as set forth in the specification and the polymeric liquid-crystal (6) as set forth in the specification was prepared in the same manner as in Example 2, and the response speed thereof was examined in the same manner as in Example 4. Results obtained are shown in Table 13.

TABLE 13

| Composition | (1-e):(6) | Response speed (ms) |
|---|---|---|
| (H) | 3:7 | 0.8 |

Example 15

Compositions comprising the copolymer (15-a) of the repeating unit (1-W) with the repeating unit ⓒ(m"=11) (ratio of copolymerization: (1-W): ⓒ=3:7) and the polymeric liquid-crystal (2-f) (m=11, $R^3$=H) were prepared in the same manner as in Example 2, and the response speed thereof was examined in the same manner as in Example 4. Results obtained are shown in Table 14.

TABLE 14

| Composition | (15-a):(2-F) | Response speed (ms) |
|---|---|---|
| (I) | 8:2 | 1.8 |
| (J) | 7:3 | 1.9 |

As having been described above, the polymeric liquid-crystal compound of the present invention and the polymeric liquid-crystal composition containing the polymeric liquid-crystal compound are materials having a large spontaneous polarization and good response characteristics. The polymeric liquid-crystal device making use of these can readily achieve large-area display, and is useful as a medium such as a display device and a memory.

What is claimed is:

1. A polymeric liquid-crystal composition comprising a polymeric liquid-crystal compound having a repeating unit represented by Formula (I)

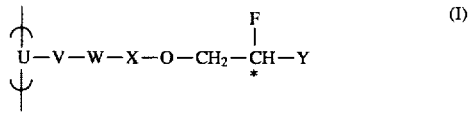

wherein U represents a polymer main chain selected from the group consisting of the following:

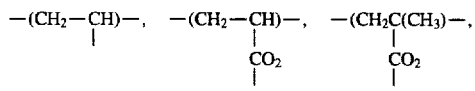

—(CH₂—CH)—,   —(OC—CH—CO₂(CH₂)ₐ—O)—,

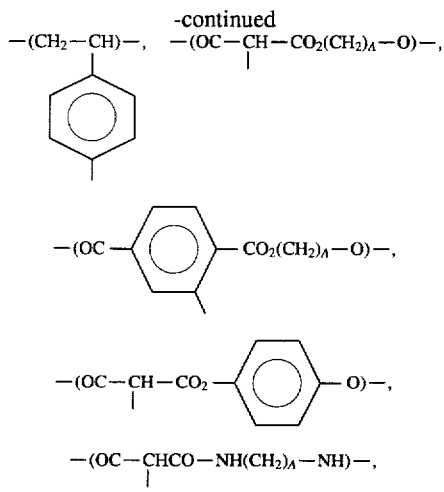

—(OC—CHCO—NH(CH₂)ₐ—NH)—, where A represents an integer of 1 to 30,

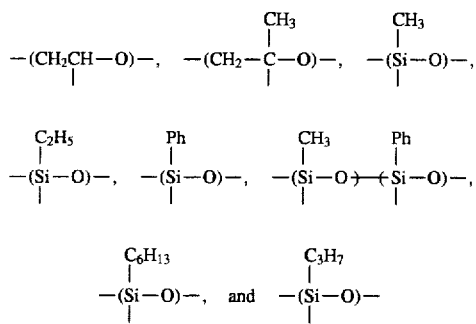

where Ph represents a phenyl group; V represents —(CH₂)ₘ—, —((CH₂)₂—O)ₘ— or —(CH₂)ₙ—((CH₂)₂—O)ₚ—, one or more of methylene hydrogen atoms of which may be substituted with an alkyl group, a halogen atom, a cyano group, an amino group or a carbonyl group, and m, n and p each represents an integer of 0 to 30; W represents a single bond, —O—, —OCO—, —COO—, —CONR¹—, —CO— or —NR¹—, where R¹ represents a hydrogen atom or a methyl group (CH₃); X represents a two or more rings of a substituted or unsubstituted aliphatic ring or aromatic ring of benzene ring, heteroaromatic ring or condensed ring, which rings are bonded through a single bond, —O—, —OCO—, —COO—, —(CH₂)_q—, —N=N—, —(CH=CH)_q—, —CH=N—, —(C≡C)_q—, —CONR¹—, —(CO)_q— or —NR¹—, where q represents an integer of 1 to 10; Y represents an alkyl group having 4 to 8 carbon atoms; and the mark * represents an asymmetric carbon atom; and at least one of a polymeric liquid-crystal compound having the repeating unit represented by Formula (II)

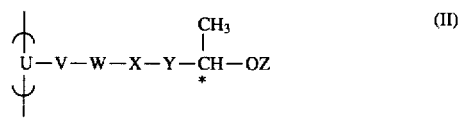

wherein U represents a polymer main chain; V represents —(CH₂)ₘ—, —((CH₂)₂—O)ₘ— or —(CH₂)ₙ— ((CH₂)₂—O)ₚ—, one or more of methylene hydrogen atoms of which may be substituted with an alkyl group, a halogen atom, a cyano group, an amino group or a carbonyl group, and m, n and p each represent an integer of 0 to 30; W represents a single bond, —O—, —OCO—, —COO—, —CONR¹—, —CO— or —NR¹—, where R¹ represents a hydrogen atom or an alkyl group; X represents two or more rings of a substituted or unsubstituted aliphatic ring or aromatic ring of benzene ring, heteroaromatic ring or condensed ring, which rings are bonded through a single bond, —O—, —OCO—, —COO—, —(CH₂)_q—, —N=N—, —(CH=CH)_q—, —CH=N—, —(C≡C)_q—, —CONR¹—, —(CO)_q— or —NR¹—, where q represents an integer of 1 to 10; Y represents —(CH₂)_r—, —CO(CH₂)_r—, —CO₂(CH₂)_r—, —O(CH₂)_r— or —OCO—, where r represents an integer of 1 to 3; Z represents —R² or —COR², where R² represents a substituted or unsubstituted alkyl group; and the mark * represents an asymmetric carbon atom.

2. A polymeric liquid-crystal composition according to claim 1, further comprising at least one other polymeric compound, at least one other polymeric compound, low-molecular compound, and/or low-molecular liquid-crystal compound.

3. The polymeric liquid-crystal composition according to claim 1, wherein said polymeric liquid-crystal compound represented by the formula I is contained in an amount of not less than 5% by weight.

4. The polymeric liquid-crystal composition according to claim 1, wherein said polymeric liquid-crystal compound represented by the formula I is contained in an amount of not less than 10% by weight.

5. A polymeric liquid-crystal device comprising the polymeric liquid-crystal composition as described in claim 1.

6. A polymeric liquid-crystal device comprising a polymeric liquid-crystal layer comprising the polymeric liquid-crystal composition as described in claim 1 between a pair of substrates having electrodes.

7. The polymeric liquid-crystal composition according to claim 1, wherein said V in formula (I) is —((CH₂)₂—O)ₘ—.

8. The polymeric liquid-crystal composition according to claim 1, wherein said m in formula (I) is an integer of from 4 to 12.

9. The polymeric liquid-crystal composition according to claim 1, wherein the compound formula (I) has an average molecular weight of from 2,000 to 1,000,000.

10. The polymeric liquid-crystal composition according to claim 1, wherein the compound formula (I) has an average molecular weight of from 4,000 to 500,000.

11. A polymeric liquid-crystal composition according to claim 1, wherein said compound having the unit represented by formula (I) is a copolymer comprised of the unit of formula (I) and at least one of other repeating units.

12. A polymeric liquid-crystal composition according to claim 1, wherein said compound having the unit represented by formula (I) is a copolymer comprised of the unit of formula (I) and a unit selected from the following units ⓐ–ⓘ:

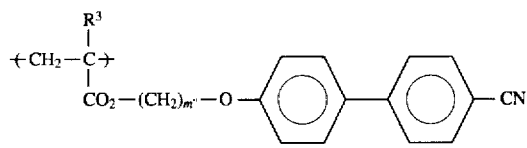 (a)
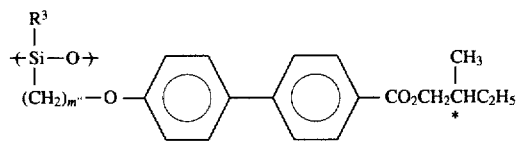 (b)
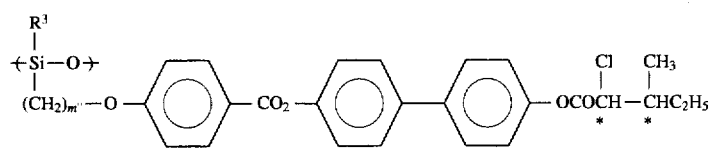 (c)
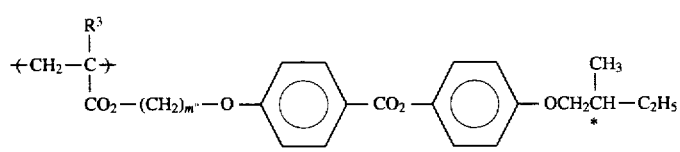 (d)
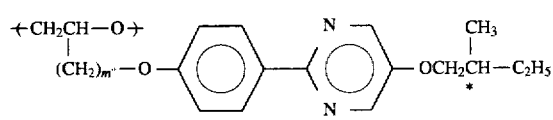 (e)
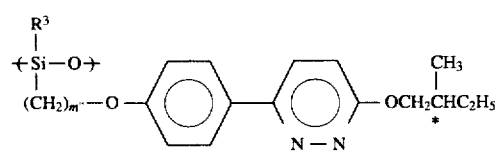 (f)
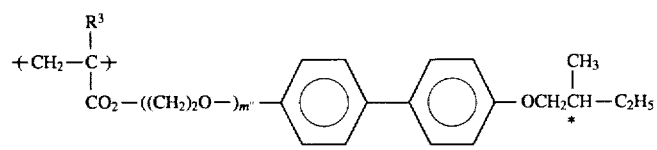 (g)
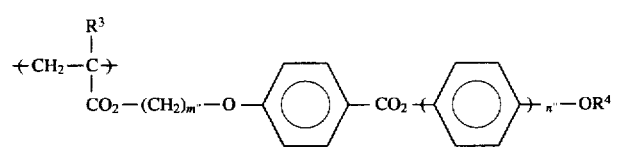 (h)
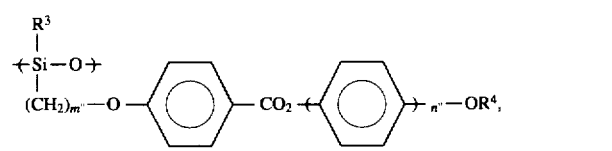 (i)
wherein $R^3$ represents a hydrogen atom, an alkyl group, a phenyl group or a halogen atom, m" represents an integer of 0 to 30, $R^4$ represents an alkyl group, and n" represents an integer of 1 to 3.
* * * * *

UNITED STATES PATENT AND TRADEMARK OFFICE
CERTIFICATE OF CORRECTION

PATENT NO. : 5,614,125
DATED : March 25, 1997
INVENTOR(S) : KOICHI SATO ET AL.

It is certified that error appears in the above-indentified patent and that said Letters Patent is hereby corrected as shown below:

COLUMN 2

Line 31, "invention" should read --embodiment--.
Line 53, "—OCO—," should be deleted.
Line 59, "invention" (first occurrence) should read --embodiment--.
Line 62, "compound" should read --compounds--.
Line 64, "invention" (first occurrence) should read --embodiment--.
Line 67, "compound" should read --compounds--.

COLUMN 18

Line 58, "|
            CO—"  should read  --|
                                   $CO_2$—--.

COLUMN 21

Line 8, "R3" should read --$R^3$--.

COLUMN 22

Line 11, "10 mol An" should read --10 mol%. An--.
Line 21, "inven-" should read --embodiment--.
Line 22, "tion" should be deleted.
Line 23, "invention" (first occurrence) should read --embodiment--.
Line 26, "compound" should read --compounds--.

UNITED STATES PATENT AND TRADEMARK OFFICE
CERTIFICATE OF CORRECTION

PATENT NO. : 5,614,125
DATED : March 25, 1997
INVENTOR(S) : KOICHI SATO ET AL.

It is certified that error appears in the above-indentified patent and that said Letters Patent is hereby corrected as shown below:

COLUMN 24

Line 38, "compound" should read --compounds--.

COLUMN 27

Line 15, insert --(2-S)--.
Line 21, "R3" should read --$R^3$--.
Line 30, "invention" (first occurrence) should read --embodiment--.

COLUMN 28

Line 23, "melamin" should read --melamine--.
Line 32, "or SiO" should read --or $SiO_2$--.
Line 63, "streching" (all occurrences) should read --stretching--.

COLUMN 29

Line 12, "Limited) a polymidie" should read --Limited), a polyimide--.
Line 30, "rubby" should read --ruby--.

COLUMN 31

Line 44, "5.12x10" should read --$5.12 \times 10^{-5}$--.

UNITED STATES PATENT AND TRADEMARK OFFICE
CERTIFICATE OF CORRECTION

PATENT NO. : 5,614,125
DATED : March 25, 1997
INVENTOR(S) : KOICHI SATO ET AL

It is certified that error appears in the above-indentified patent and that said Letters Patent is hereby corrected as shown below:

<u>COLUMN 33</u>

Line 25, "his" should read --this--.

Signed and Sealed this

Thirtieth Day of September, 1997

Attest:

BRUCE LEHMAN

*Attesting Officer*        *Commissioner of Patents and Trademarks*